Oct. 7, 1969     H. L. RATLIFF, JR     3,471,224
STEREOSCOPIC AND/OR A PERIPHERAL VISION THEATRICAL SYSTEM
Filed Feb. 27, 1967     2 Sheets-Sheet 1

INVENTOR
Harvey L. Ratliff Jr.

Oct. 7, 1969　　　　H. L. RATLIFF, JR　　　　3,471,224
STEREOSCOPIC AND/OR A PERIPHERAL VISION THEATRICAL SYSTEM
Filed Feb. 27, 1967　　　　　　　　　　　　2 Sheets-Sheet 2

INVENTOR
Harvey L. Ratliff Jr.

United States Patent Office 3,471,224
Patented Oct. 7, 1969

3,471,224
STEREOSCOPIC AND/OR A PERIPHERAL
VISION THEATRICAL SYSTEM
Harvey L. Ratliff, Jr., Oxon Hill, Md., assignor to
Jetru Inc., Amarillo, Tex.
Continuation-in-part of applications Ser. No. 275,411,
Apr. 24, 1963, Ser. No. 483,728, Aug. 30, 1965,
and Ser. No. 502,814, Oct. 13, 1965. This application Feb. 27, 1967, Ser. No. 618,977
Int. Cl. G03b 31/00, 35/08, 35/26
U.S. Cl. 352—60    10 Claims

ABSTRACT OF THE DISCLOSURE

A motion picture theater has an individual viewing apparatus at each seat. Each viewing apparatus is provided with right eye and left eye lenses and polarizers. The curvature of each lens has a fixed relation with the lens curvature of a motion picture camera wide angle lens such that the distortion introduced by the wide angle camera lens is compensated for by the viewer lenses to provide a distortion-free wide-angle stereoscopic picture. Additional apparatus is provided for simulating temperature, wind, and odor conditions.

---

This is a continuation-in-part of my copending applications: Ser. No. 483,728, filed Aug. 30, 1965 now Patent No. 3,326,106, the original being filed Nov. 15, 1962; Ser. No. 502,814, filed Oct. 13, 1965 now abandoned, the original being filed Jan. 10, 1963; Ser. No. 275,411, filed Apr. 24, 1963 now abandoned, and Ser. No. 343,841, filed Feb. 10, 1964.

The present invention pertains generally to the re-creation of wide-angle stereoscopic pictures directly in front of each of a multiplicity of spectators in a theater.

It has long been the desire to achieve a medium with the capacity of portray drama, action, scenes, and events with the same degree of realism as a viewer would see and observe in the actual situations were the viewer or spectator actually present on the spot.

Throughout history there have been many attempts to approach the solution of this problem, which are appropriately set forth in U.S. Patent 3,291,904.

It is the primary object of the present invention to solve problems solved by my U.S. Patent 3,291,904 in a cheaper and more economical manner.

Substantially all the teachings of the present invention have been taught or suggested in the combination of my said copending application Ser. Nos. 483,728, 502,814, 275,411, and 343,841, but they have not heretofore been combined into a single unitary claimed invention.

The primary advantage over Patent 3,291,904 offered by the present invention is the tremendous savings it makes possible by accomplishing the same result without the use of expensive video equipment.

Other objects and advantages of my invention will become apparent from a study of the following description taken with the accompanying drawings wherein.

Figure 1:
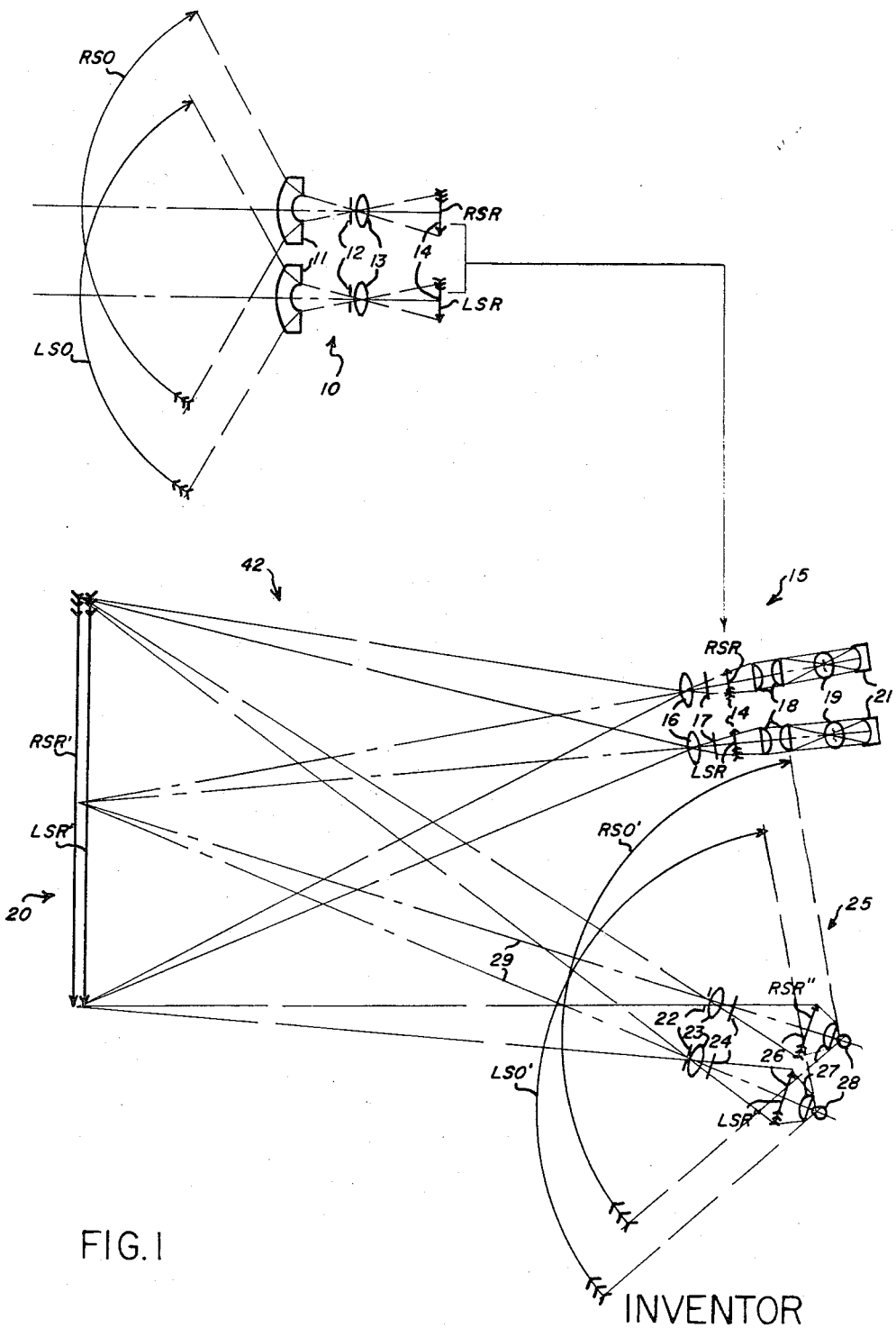
FIG. 1 is a diagrammatical illustration of the wide-angle stereoscopic system of the present invention.

For a detailed description of the present invention, reference is now made to FIG. 1.

For taking the pictures there is provided a wide-angle stereoscopic fisheye type taking lens system 10 for transforming a substantially spherical stereoscopic subject situation RSO, LSO into a substantially flat stereoscopic image situation RSR, LSR and thereby introducing a substantial amount of barrel distortion upon the transformed images RSR and LSR. Therefore, these fisheye type images can be recorded on a relatively small area of flat recording media such as photographic film 14 and this film is usable in narrow angle projection equipment and otherwise conventional equipment, such as conventional film feed mechanism of motion-picture cameras and projectors.

The fisheye taking arrangement may be as described in said 275,411, or it may be one of the known fisheye systems, i.e., "Nikon Fisheye," "Kenko Fisheye Conversion," "Kinoptik Super Tegea," or the original "Hill Fisheye." Each one of these lenses transforms a substantially spherical subject situation into a substantially flat image situation in that:

$$y/\theta \cong k$$

where $\theta$ equals the angle an entering ray makes with the optical axis of the fisheye lens, $y$ equals the distance from the picture center that said entering ray is focused upon the image plane at film 14, and $k$ remains substantially constant for relatively high values of $\theta$, i.e., over 70° in each direction (140° from periphery to periphery).

There are negative compressing lenses 11, apertures 12 and focusing lenses 13 coaxial about two respective optical axes which are substantially parallel and the interpupillary distance apart supported in this manner by well known or obvious structure to make up taking lens system 10.

There is provided a theatrical arrangement 42 in a theater. There is a screen 20 at the front of the theater. There is a narrow angle stereoscopic projecting means 15 within the theater for projecting both the right and left transformed images, RSR and LSR, respectively, from the said media or film 14 to the said screen 20 as enlarged transformed images RSR' and LSR', respectively. There is a means 17 within the said projecting means 15 for separately projecting each of the right and left eye views upon screen 20, which could be cross polarizers or different colored filters or the like so that there are two pictures on the same screen separately focused thereon.

The projecting means 15 may otherwise be conventional or obvious having reflectors 21, lamps 19, condenser 18, film 14, the said means 17, and objectives 16 and well known mechanical mechanism.

There is a multiplicity of wide-angle stereoscopic optical viewing devices 25 in the theater for reverse-transformation of the images upon screen 20 from the substantially flat narrow-angle image situation. RSR', LSR' and RSR'', LSR'' back into the wide-angle substantially spherical subject situation RSO', LSO'', introducing the reversing pincushion distortion to eliminate the barrel distortion and cause the rays to enter the eyes 28 of each of a multiplicity of spectators looking into 25 substantially as said rays entered taking lenses 10 to create the sensation of greater than some 120° peripheral vision in the horizontal plane.

Apertures or stops 22 may be provided to vary the light intensity, because a screen bright enough for the rear seats of the theater would be relatively bright for the front seats. Lenses 23 are conventional camera lenses for focusing images of RSR' and LSR', which are RSR'' and LSR'', respectively at the focal planes of oculars 27. This was done in the said Ser. No. 483,728, in that they both reproduce an image of a flat picture for viewing at the focal plane of wide-angle oculars such as 27. The respective picture centers of RSR' and LSR' hereof could be spaced apart the interpupillary distance as in said Ser.

No. 483,728 or made coincident with optical axes 29 converging thereto, as shown in FIG. 1 hereof.

Camera lenses 23 can be highly corrected allowing very wide apertures for 22 since "depth of field" is no problem.

There is a means 24 within each of said viewing devices 25 which causes the right eye view image RSR' upon screen 20 to reach only the right eye of eyes 28 and left eye view image LSR' upon screen 20 to reach only the left eye of eyes 28, which could be respective cross analizers or color analizers.

The wide-angle oculars 27 which reverse-transform back from a flat image situation to a spherical subject situation could be the type originally described in the original application of said Ser. No. 483,728 and now available to the public in U.S. Patent 3,272,069 or they could be the type originally described in said 275,411 one variety of which is now available to the public in U.S. Patent 3,298,771 or they could have the appearance of those shown in FIG. 1 of U.S. Patent 2,955,156.

The essential characteristic of the ocular lenses 27 is:

$$y'/\theta' \cong k'$$

where $\theta'$ equals the angle a ray entering eye 28 makes with the corresponding optical axis of 29, $y'$ equals the distance from said optical axis of 29 on image RSR'' to the point the said ray originates from which enters said eye of 28, and $k'$ remains substantially constant for relatively high values of $\theta'$, i.e. over 60° in both directions (120° in all). This relationship is inherent in many simple positive oculars and becomes noticeable when $\theta'$ is greater than some 20°. What is really important is that $k$ is substantially the same as $k'$ even if they are not constant, but the applicant's experience is that many available fisheye systems have a substantially constant $k$ and many oculars have a substantially constant $k'$, at wide angles.

Figure 2:
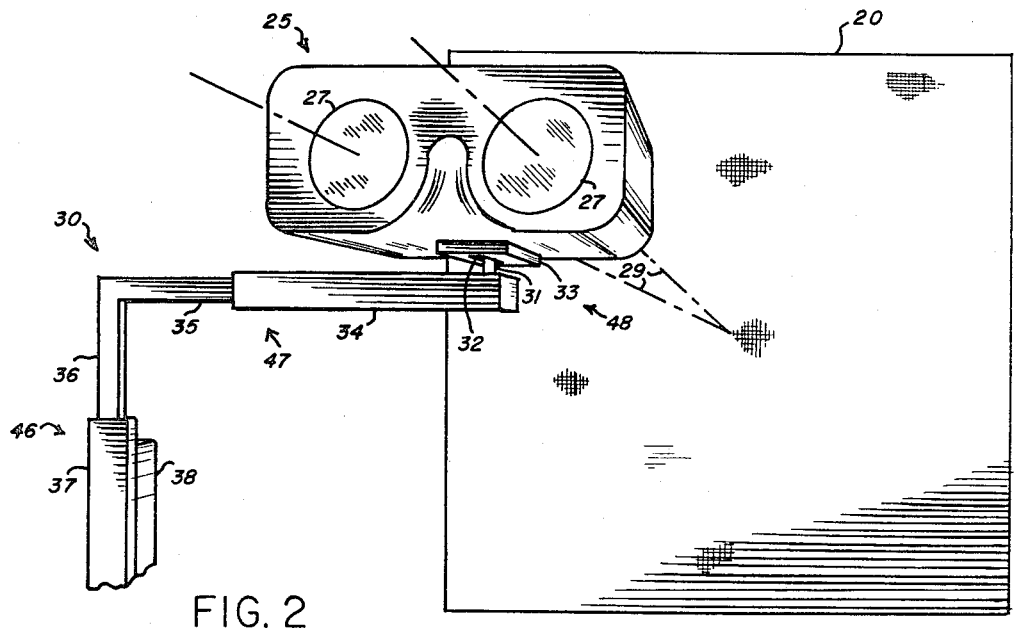
FIG. 2 is a perspective view showing the relationship of a particular viewing device with respect to the theatrical screen.

Referring now to FIG. 2, viewing device 25, as stated earlier, can be designed such that optical axes 29 intersect at approximately the center of the images upon screen 20. Oculars 27 can be made adjustable for different interpupillary distances of spectator's eyes in one of the well known manners. There is a means 30 provided to assure that the two axes 29 intersect at substantially the center of 20 while still allowing substantial freedom of movement for the respective spectator.

There is a means 46 provided whereby each of said viewing devices 25 may be displaced substantially perpendicular to the respective axes 29 from some one foot to some two feet vertically. There is a means 47 provided whereby each of the viewing devices 25 may be displaced substantially perpendicular to the respective axes 29 from someone foot to some two feet horizontally. There is a means 48 provided whereby each of the viewing devices 25 may be displaced axially substantially along the respective axes 29 approximately one foot.

Means 46 comprises member 36 which may freely move vertically within member 37 by well-known or obvious means. At the same time member 37 holds member 36 from all other movement by well-known or obvious means. There is a balancing weight, pulley arrangement within member 38 which utilizes well-known or obvious means to counterbalance the weight of 25 and 30 whereby 25 stays in the vertical location at which it is placed.

Means 47 comprises member 35 which is rigidly secured to member 36 and member 34 which freely moves reciprocally upon member 35 horizontally and perpendicular to axes 29 and is held from all other movement by well-known or obvious means.

Means 48 comprises member 31 which is rigidly secured to member 34 and fits into axial opening 32 of member 33 which is rigidly secured to viewing device 25. Well-known or obvious means are utilized whereby member 33 can be freely moved axially with respect to member 31 while member 33 is held from all other movement relative to member 31.

Since the screen 20 is relatively large, having side edge dimensions from some thirty feet to some sixty feet, one foot or two feet lateral movements of 25 have only negligible effects upon the re-created images before respective spectators and since the screen 20 is relatively far from each spectator, i.e. from some thirty feet to some one hundred feet, one foot or two feet axial movements of viewing devices 25 have only a negligible effect also.

Also the well-known methods of conventional theaters are employed to assure that each viewing device 25 has a clear view of screen 20.

Figure 3:
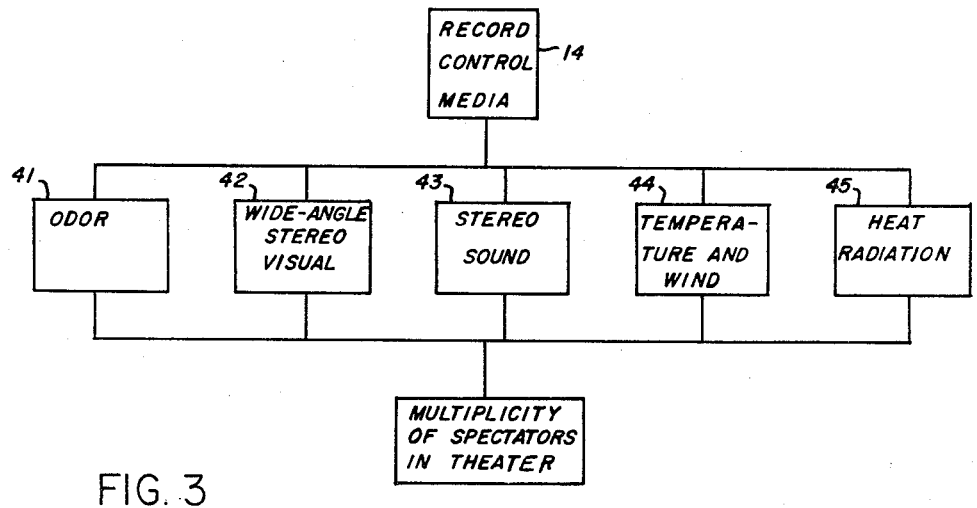
FIG. 3 is a block diagram showing a complete theatrical arrangement in which the present invention may be a part.

The wide-angle stereoscopic system of the present invention may be used as a subcombinational part of the theatrical arrangement illustrated in FIG. 3. There is provided apparatus 43 for bringing stereosound to each spectator of the theater viewing into a device 25 which may be as described in my copending application Ser. No. 287,338, filed June 12, 1963, and in part disclosed in said U.S. Patent 3,291,904 or as described in said Ser. No. 502,814, or U.S. Patent 3,293,358, from media or film 14.

There is provided apparatus 41 for bringing the odor conditions of the portrayal as recorded upon media or film 14 to each spectator viewing into a viewing device 25 which may be as described in said U.S. Patent 3,291,904.

There is provided apparatus 44 for bringing the temperature and wind conditions of the portrayal as recorded upon media or film 14 to each spectator viewing into a viewing device 25 which may be as described in said U.S. Patent 3,291,904.

There is provided apparatus 45 for bringing the heat radiation conditions of the portrayal as recorded upon media or film 14 to each spectator viewing into a viewing device 25 which may also be as described in said U.S. Patent 3,291,904.

Speaker S8 and odor outlet 89 (of said U.S. Patent 3,291,904) could be secured to member 34 hereof in an obvious manner. In other respects viewing device 25 works in conjunction with the apparatus of FIG. 3 hereof as KD does with the corresponding nonvisual apparatus of said Patent 3,291,904.

It will be noted that if RSR'' and LSR'' are changed in size such that each distance which was $y$ for RSR and LSR is $y'$ for RSR'' and LSR'', the size change being rectilinear and performable by the proper selection of lenses 23, the re-created stereoscopic scene RSO', LSO' will be substantially distortion free and orthostereoscopic is the optical axes of lenses 10 are spaced apart substantially the interpupillary distance. For more details as to the proper sizing of RSR'', LSR'', the reader is referred to my copending patent application Ser. No. 607,963, filed Jan. 9, 1967, and application Ser. No. 560,531, filed June 27, 1966.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

I claim:

1. The combination with a theater having therein a projector, a screen in operative relation with said projector, and a seat in operative relation with said screen for enabling a spectator in said seat to view said screen when pictures are projected thereupon by said projector from film therein, and for use when said pictures each have a fisheye-type relation in that:

$$k = y/\theta$$

wherein $\theta$ is the angle an entering ray makes with the optical axis of the lens used to make the picture, $y$ is the distance from the picture center of the picture focused upon said film to the point of focus of said ray upon said film, and $k$ remains substantially constant for large values of $\theta$, of:

a viewing device comprising: a housing; a pair of wide-angle oculars operatively supported by said housing such that their optical axes pass through the centers of the eyes of an ordinary viewing observer at said seat looking thereinto, said wide-angle oculars having optical surfaces with radii of curvature dimensioned and centered on the respective said optical axes such that each ocular has a predetermined property $k'$, where:

$$k' = y'/\theta'$$

if $\theta'$ is the angle of a ray entering one of said eyes makes with the corresponding one of said optical axes, $y'$ is the distance from this optical axis to the point said ray originates on the object plane of the corresponding said ocular, and $k'$ remains substantially constant for large values of $\theta'$; and a pair of focusing lenses operatively supported by said housing in optical alignment with said oculars and said screen for forming images of said pictures upon the object planes of said oculars of a size whereby the $k$ of said images is substantially the same as the $k'$ of said oculars and spaced apart such that said eyes can operatively merge the two images to view the substantially distortion-free, astigmatic-free and wide-angle scene thusly re-created when said film is used.

2. The combination of claim 1 wherein: the pictures upon said film are operatively stereoscopically coupled pairs of pictures, said projector includes means for projecting said pairs of pictures and polarizers in optical alignment with the projected pairs of pictures whereby the centers of the projected pictures coincide upon said screen and one projected picture has an axis of polarization which is opposite from the other, and said viewing device includes analyzers in optical alignment with said screen and said focusing lenses whereby said scene is additionally stereoscopic.

3. The combination of claim 2 wherein said theater is additionally in operative combination with a stereophonic reproduction system for accompanying said scene with the stereophonic sounds of said scene for said spectator.

4. The combination of claim 3 wherein said theater is additionally in operative combination with odor simulating means for accompanying said scene with the odors of said scene for said spectator.

5. The combination of claim 4 wherein said theater is additionally in operative combination with heat radiation simulating means, temperature simulating means, and wind simulating means for respectively accompanying said scene with the heat radiation, temperature, and wind of said scene for said spectator.

6. The combination with a theater having therein a projector, a screen in operative relation with said projector, and a seat in operative relation with said screen for enabling a spectator in said seat to view said screen when pictures are projected thereupon by said projector from film therein, and for use when said pictures are wide-angle, of:

a viewing device comprising: a housing; a pair of wide-angle oculars operatively supported by said housing such that their optical axes pass through the centers of the eyes of an ordinary viewing observer looking thereinto, said wide-angle oculars having optical surfaces with radii of curvature dimensioned and centered on the respective said optical axes such that each ocular has a predetermined property $k'$, where:

$$k' = y'/\theta'$$

if $\theta'$ is the angle a ray entering one of said eyes makes with the corresponding one of said optical axes, $y'$ is the distance from this optical axis to the point at which said ray originates on the object plane of the corresponding said ocular, and $k'$ remains substantially constant for large values of $\theta'$; a pair of focusing lens means operatively supported by said housing in optical alignment with said oculars and said screen for coacting with said pictures to form, at the respective object plane of each of said oculars, images having the following relation:

$$k = y/\theta$$

where $\theta$ is the angle an entering ray made with the optical axis of the wide-angle lens used to take the pictures, $y$ is the distance from the optical center of the corresponding one of said images at the corresponding object plane of said oculars to the point of recording of said entering ray as measured perpendicular to the corresponding one of said optical axes, and $k$ remains substantially constant for large values of $\theta$ and approximately equal to $k'$, and spaced apart such that said eyes can operatively merge the two images to view the substantially distortion-free, astigmatic-free and wide-angle scene thusly re-created when said film is used.

7. The combination of claim 6 wherein: the pictures upon said film are operatively stereoscopically coupled pairs of pictures, said projector includes means for projecting said pairs of pictures and polarizers in optical alignment with the projected pairs of pictures whereby the centers of the projected pictures coincide upon said screen and one projected picture has an axis of polarization which is opposite from the other, and said viewing device includes analyzers in optical alignment with said oculars and said focusing lenses whereby said scene is additionally stereoscopic.

8. The combination of claim 7 wherein said theater is additionally in operative combination with a stereophonic reproduction system for accompanying said scene with the stereophonic sounds of said scene for said spectator.

9. The combination of claim 8 wherein said theater is additionally in operative combination with odor simulating means for accompanying said scene with the odors of said scene for said spectator.

10. The combination of claim 9 wherein said theater is additionally in operative combination with heat radiation simulating means, temperature simulation means, and wind simulation means for respectively accompanying said scene with the heat radiation, temperature, and wind of said scene for said spectator.

References Cited

UNITED STATES PATENTS

| | | |
|---|---|---|
| 1,313,262 | 8/1919 | Compere. |
| 1,334,480 | 3/1920 | Zimmer _____ 352—57 |
| 2,157,099 | 5/1939 | Rosenhaur _____ 352—62 |
| 3,050,870 | 8/1962 | Heilig _____ 352—57 X |
| 3,189,915 | 6/1965 | Tondreau _____ 352—60 |

FOREIGN PATENTS

| | | |
|---|---|---|
| 934,747 | 5/1948 | France. |
| 1,050,728 | 1/1954 | France. |
| 1,126,970 | 12/1956 | France. |
| 438,935 | 9/1948 | Italy. |

NORTON ANSHER, Primary Examiner

MONROE H. HAYES, Assistant Examiner

U.S. Cl. X.R.

350—198; 352—85; 353—8